Figure 1:
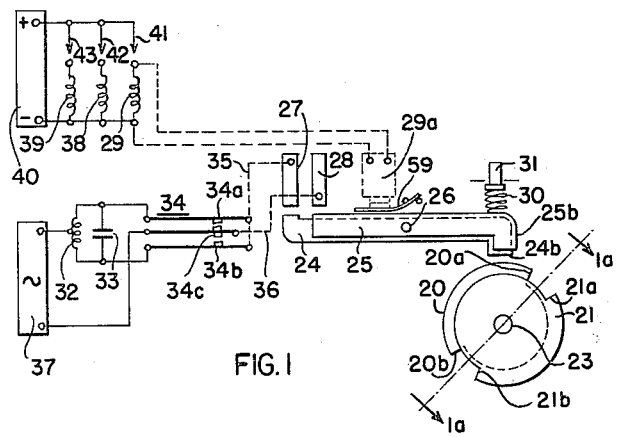

Sept. 11, 1951  H. F. ELLIOTT  2,567,325
APPARATUS FOR POSITIONING A ROTARY CONTROLLED ELEMENT
Filed March 30, 1949  9 Sheets-Sheet 1

*INVENTOR.*
HAROLD F. ELLIOTT
BY Laurence B Dodds
ATTORNEY

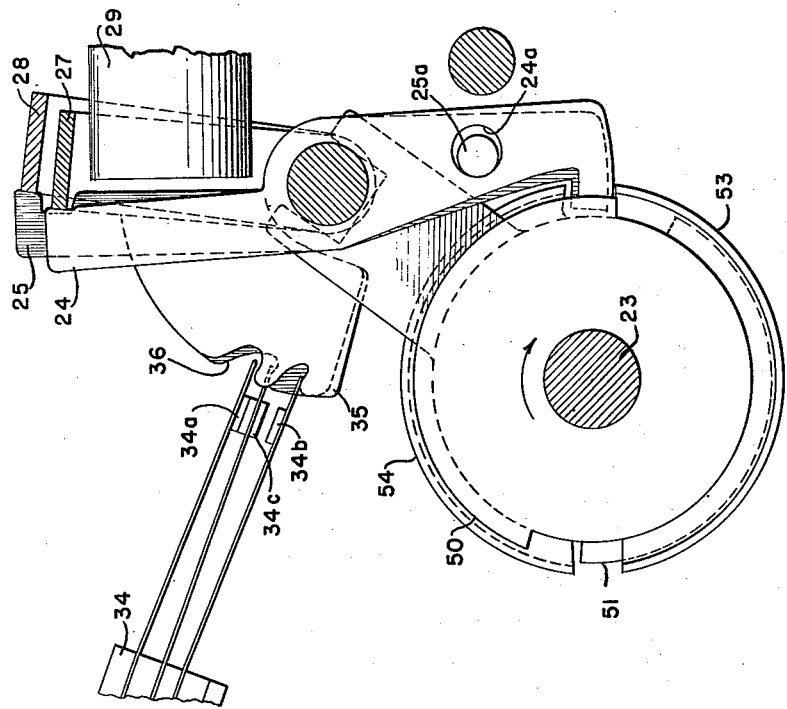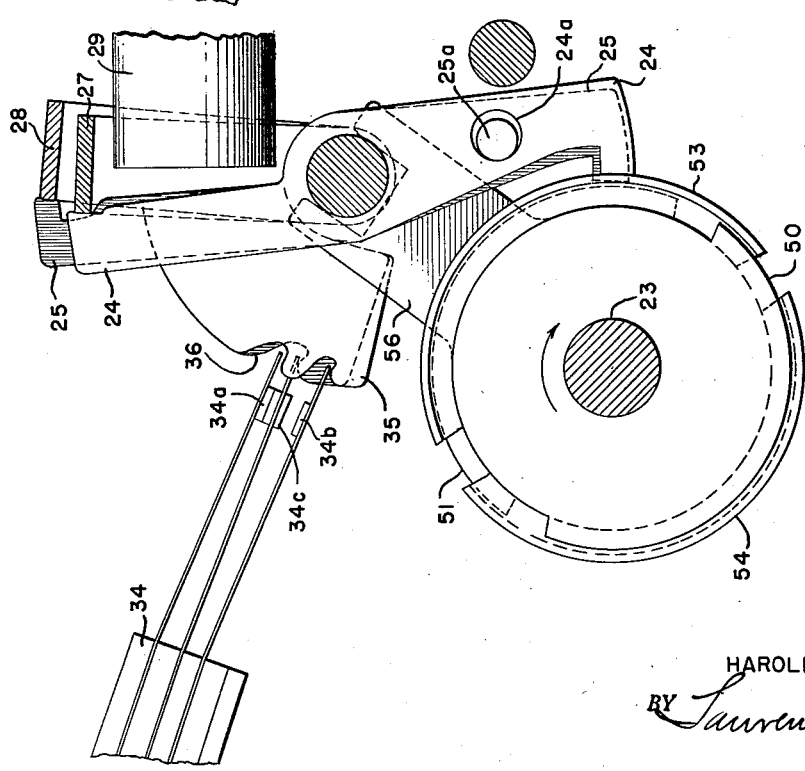

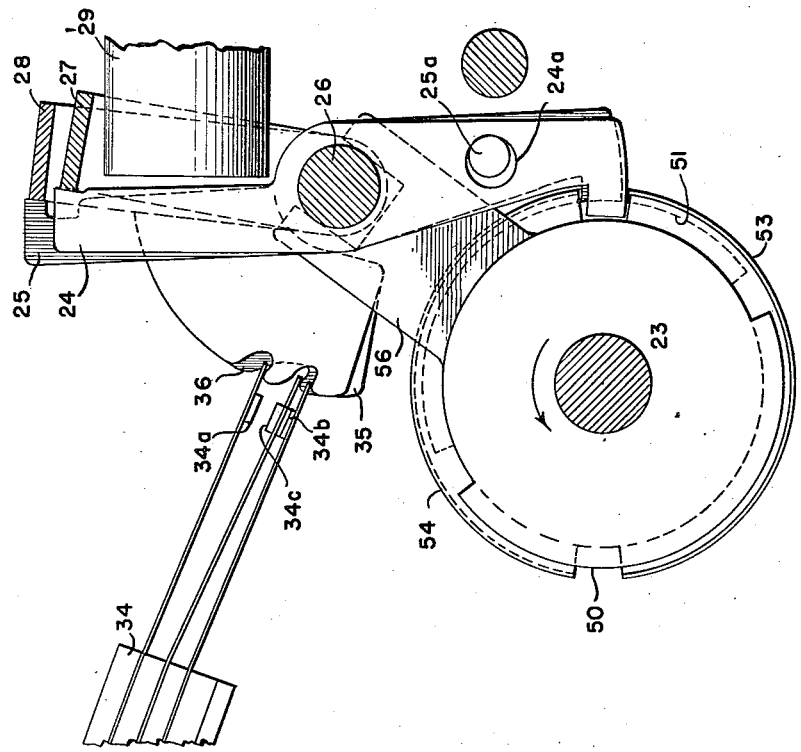
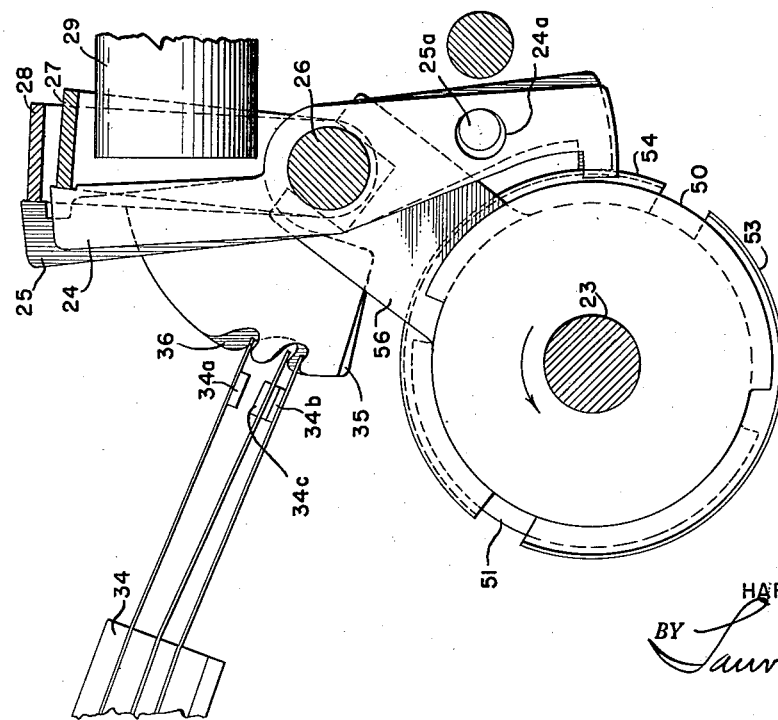

Sept. 11, 1951 H. F. ELLIOTT 2,567,325
APPARATUS FOR POSITIONING A ROTARY CONTROLLED ELEMENT
Filed March 30, 1949 9 Sheets-Sheet 6

*INVENTOR.*
HAROLD F. ELLIOTT
BY
ATTORNEY

Sept. 11, 1951 H. F. ELLIOTT 2,567,325
APPARATUS FOR POSITIONING A ROTARY CONTROLLED ELEMENT
Filed March 30, 1949 9 Sheets-Sheet 7

INVENTOR.
HAROLD F. ELLIOTT
BY
ATTORNEY

Sept. 11, 1951  H. F. ELLIOTT  2,567,325
APPARATUS FOR POSITIONING A ROTARY CONTROLLED ELEMENT
Filed March 30, 1949  9 Sheets-Sheet 8
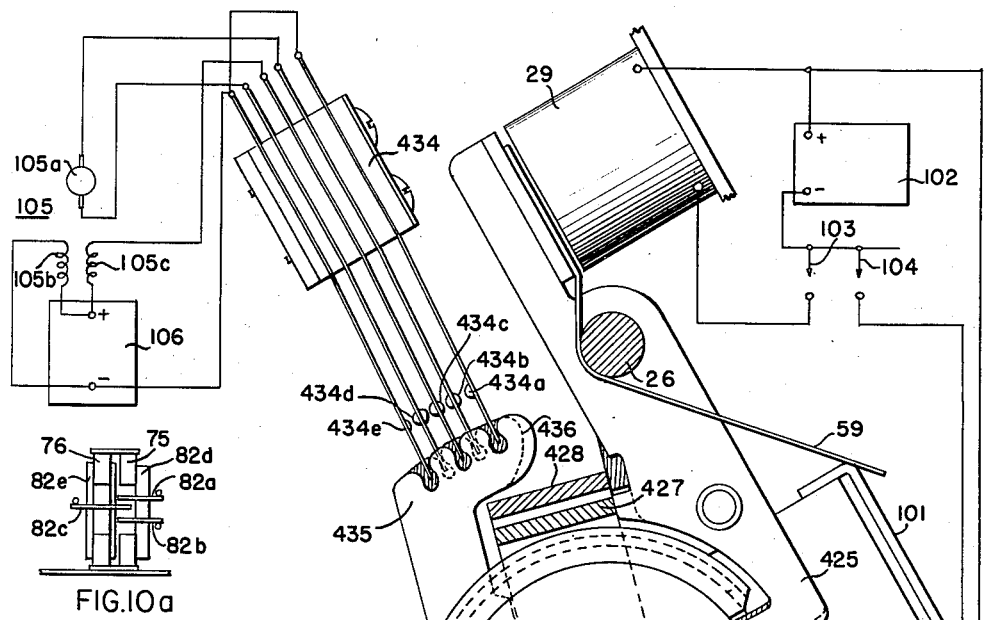
FIG.10a
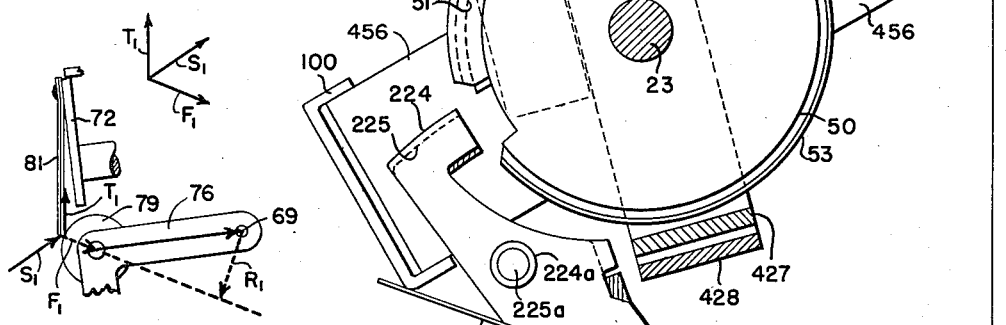
FIG.10b
FIG.13
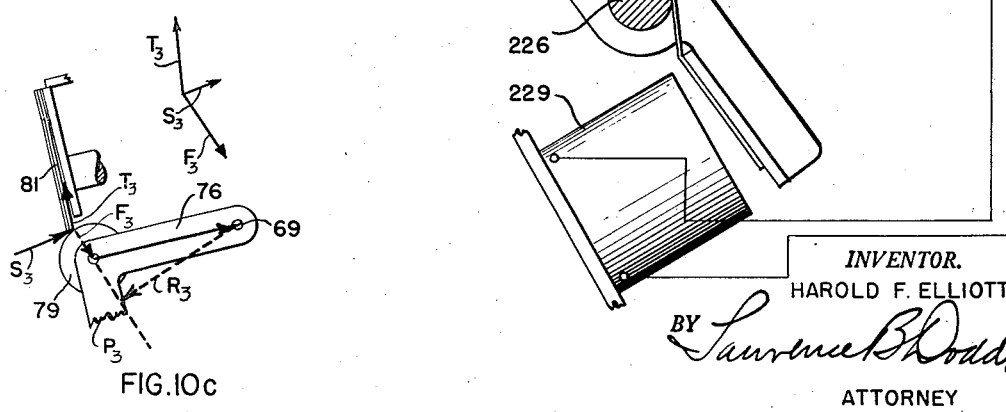
FIG.10c
INVENTOR.
HAROLD F. ELLIOTT
BY Laurence B. Dodds
ATTORNEY Sept. 11, 1951  H. F. ELLIOTT  2,567,325
APPARATUS FOR POSITIONING A ROTARY CONTROLLED ELEMENT
Filed March 30, 1949  9 Sheets-Sheet 9

*INVENTOR.*
HAROLD F. ELLIOTT
BY Lawrence B. Dodds
ATTORNEY

Patented Sept. 11, 1951

2,567,325

UNITED STATES PATENT OFFICE 2,567,325

APPARATUS FOR POSITIONING A ROTARY CONTROLLED ELEMENT

Harold F. Elliott, Palo Alto, Calif.

Application March 30, 1949, Serial No. 84,302

35 Claims. (Cl. 192—142)

1

This invention relates to apparatus for positioning a rotary controlled element and, while it is of general application, it is particularly suitable for embodiment in a motor-driven tuner for selectively tuning a radio receiver to any of a number of preselected receiving channels and will be specifically described in that connection.

The problem of remote control of radio receivers is a very old one. By way of review, certain widely used prior tuners will be briefly mentioned. One of the first and simplest included a commutator having two conducting segments and a brush for each tuning position, or its equivalent, a single conductive segment and two brushes for each position, both of which arrangements were widely used in the early development of the art. Among other disadvantages of this type of tuner is the relatively low precision of setting obtainable.

A later development of this type of apparatus extended its operation to multiple revolutoin devices and further added latches for mechanically positioning the controlled element precisely in preselected positions. Such a modification is described and claimed in applicant's copending application Serial No. 775,026, filed September 19, 1947.

Another such tuning arrangement in wide use and applicable to a controlled element having rotation of one half revolution or less includes a cam disc having high and low cam segments with a notch therebetween and a co-operating cam follower or latch which actuates one or more switches for controlling the operating motor to rotate the shaft and bring the latch into engagement with the notch. Apparatus of such type is illustrated and claimed in applicant's prior Patents 2,249,753 and 2,299,082. Developments extending the operation of this type of apparatus to multiple revolution devices are described and claimed in applicant's copending applications Serial Nos. 771,999 and 772,000, now Patent Number 2,517,854, issued August 8, 1950, both filed September 3, 1947.

The present invention represents an improvement on the apparatus constituting the foregoing developments and has as its objective to provide an apparatus for positioning a rotary controlled element, such as the tuning element of a radio receiver, having a number of advantages, among the important ones of which are its great flexibility and simplicity of construction and operation; its directness of operation to the desired or home position; the elimination of lost motion effects in the mechanical elements of the apparatus and the resultant increased precision; the elimination of error due to distortion of certain of the operating elements of the apparatus which are subjected to considerable forces; the elimination of error due to deflection of one or more of the operating shafts of the apparatus when the invention is embodied in an apparatus including a relatively large number of selector units for positioning the control element in a corresponding number of preselected positions; and the elimination of regions of extraneous operation, a feature of particular advantage in multiple-revolution devices.

It is an object of the present invention, therefore, to provide an apparatus for positioning a rotary controlled element which operates either through a range of less than one half revolution or through multiple revolutions.

It is a further object of the invention to provide a positioning apparatus of the type described which embodies one or more of the above-mentioned desirable advantages.

In accordance with the invention, there is provided an apparatus for positioning a rotary controlled element in a predetermined angular position comprising at least one pair of substantially complementary rotatable sector members having stop provisions and a pair of independently movable stop devices, each disposed individually to register with the stop provisions of one of the sector members only when the controlled element is in such predetermined angular position. The apparatus also includes a reversible driving system for concurrently driving the sector members and the controlled element and a sensing means responsive to relative movement between the stop devices for controlling the direction of operation of the reversible driving system in accordance with the sense of relative displacement of such stop devices.

Further in accordance with the invention, there is provided apparatus for positioning a rotary controlled element in a predetermined angular position comprising a fast member rotatable within a multi-revolution range and including a pair of substantially complementary sector members and stop provisions and a slow rotatable member including a pair of substantially complementary sector members and stop provisions. The apparatus also includes a pair of independently movable stop devices, each disposed individually to register with the stop provisions of one of such fast and slow members only when the controlled element is in a predetermined angular position. The apparatus further includes a reversible driving system for driving the controlled element and for driving the rotatable members at a preselected speed ratio and sensing means responsive to relative movement between the stop devices for controlling the direction of operation of the reversible driving system in accordance with the sense of relative displacement of the stop devices.

By the term "stop provisions," as used herein and in the appended claims, is meant any deviation inwardly, outwardly or axially from the periphery of the rotatable sector members with which a co-operating stop device, such as a latch, may co-operate to arrest rotation of the sector member. By the term "complementary" as applied to a pair of rotatable sector members is meant that these are two similar members, one for each direction of rotation, and that these members plus their stop provisions cover the operating range in the two directions of rotation. Usually, though not necessarily, the pair of complementary members aggregate a full circle. The sector members may be on the same rotatable member, as in the case of a half-revolution device described hereinafter, or on different rotatable members, in which case they may have the same or parallel axes. In some cases the pair of sector members may be merged into the same physical element; for example, they may comprise opposite end portions of a single sector structure, one end being used for each direction of rotation.

By the term "rotary controlled element" is meant an element to be positioned, which may be either the final driven element of the apparatus, such as the tuning condenser of a radio receiver, or an intermediate driven element of the apparatus, such as a rotary threaded element for providing translatory movement of the tuning element of the receiver.

For a better understanding of the invention, together with other and further objects thereof, reference is had to the following description taken in connection with the accompanying drawings, and its scope will be pointed out in the appended claims.

Figure 1A:
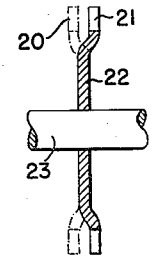
Figure 2:
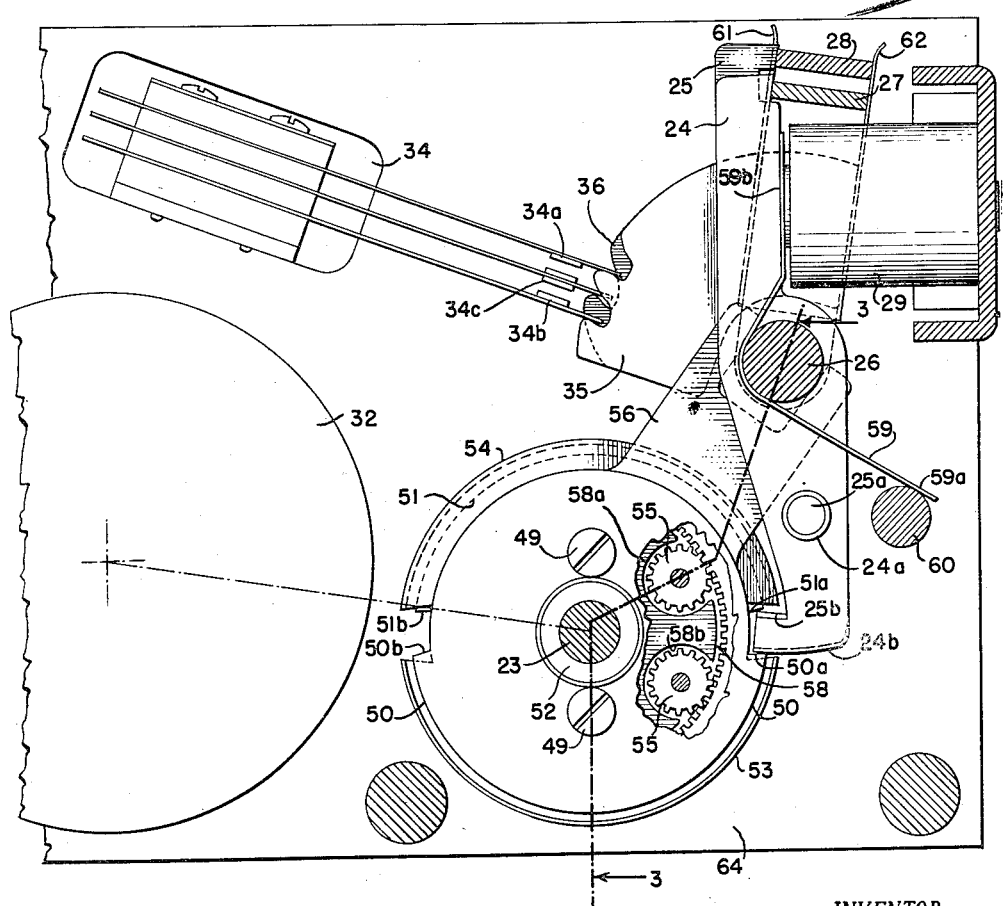
Figure 3:
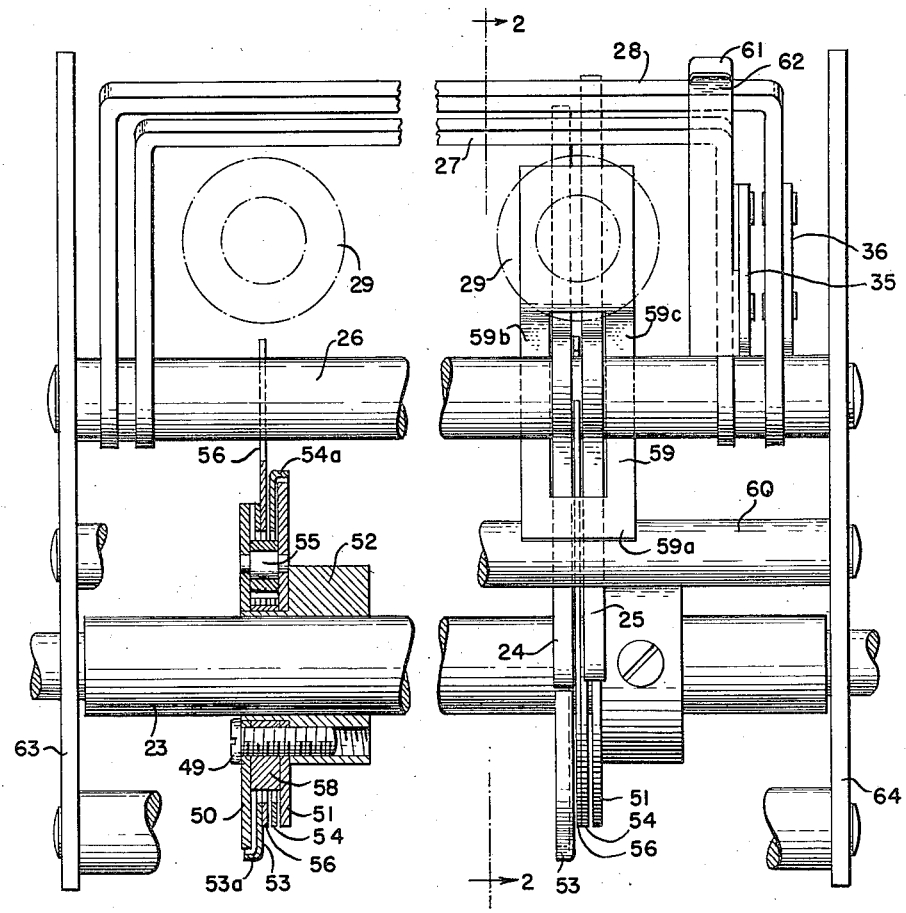
Figure 8:
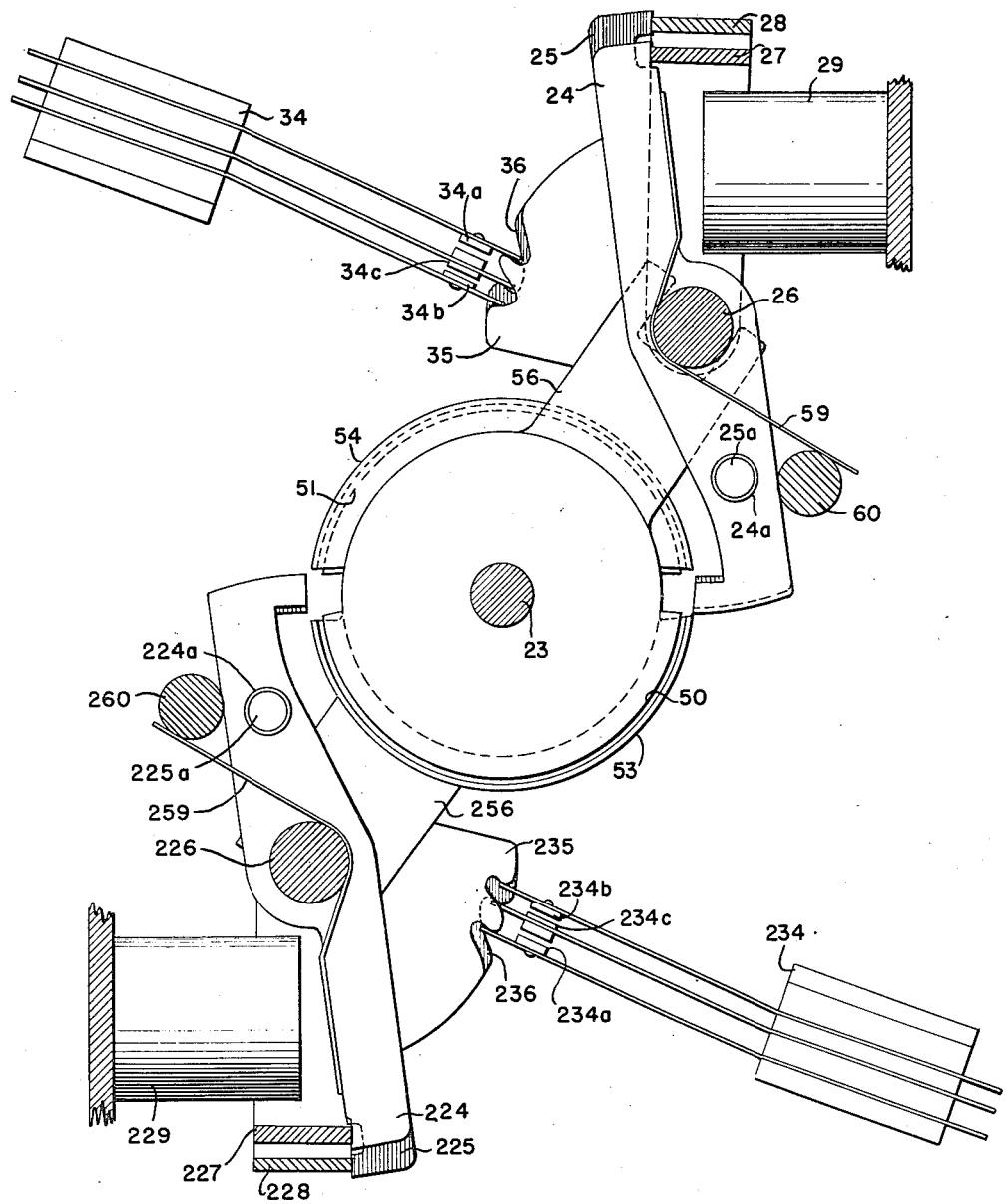
Figure 9:
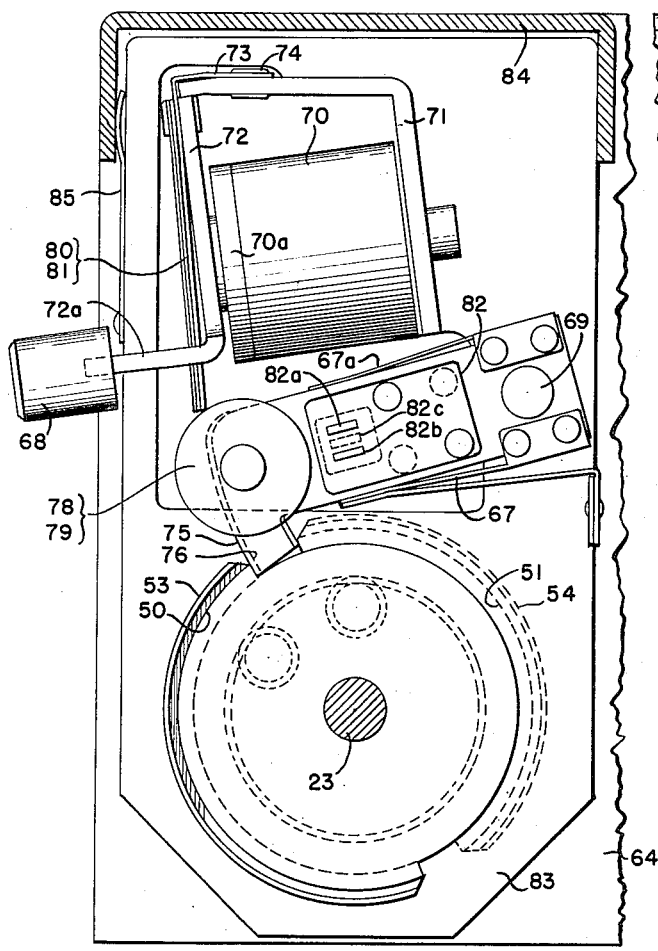
Figure 10:
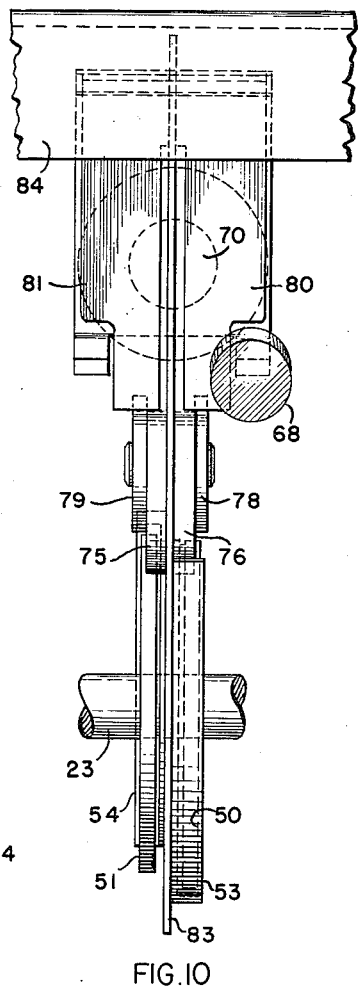
Figure 12:
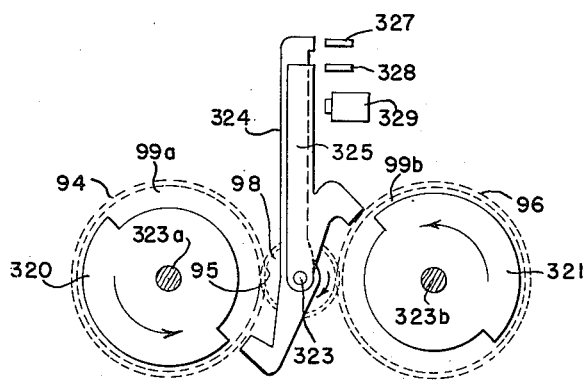
Figure 11:
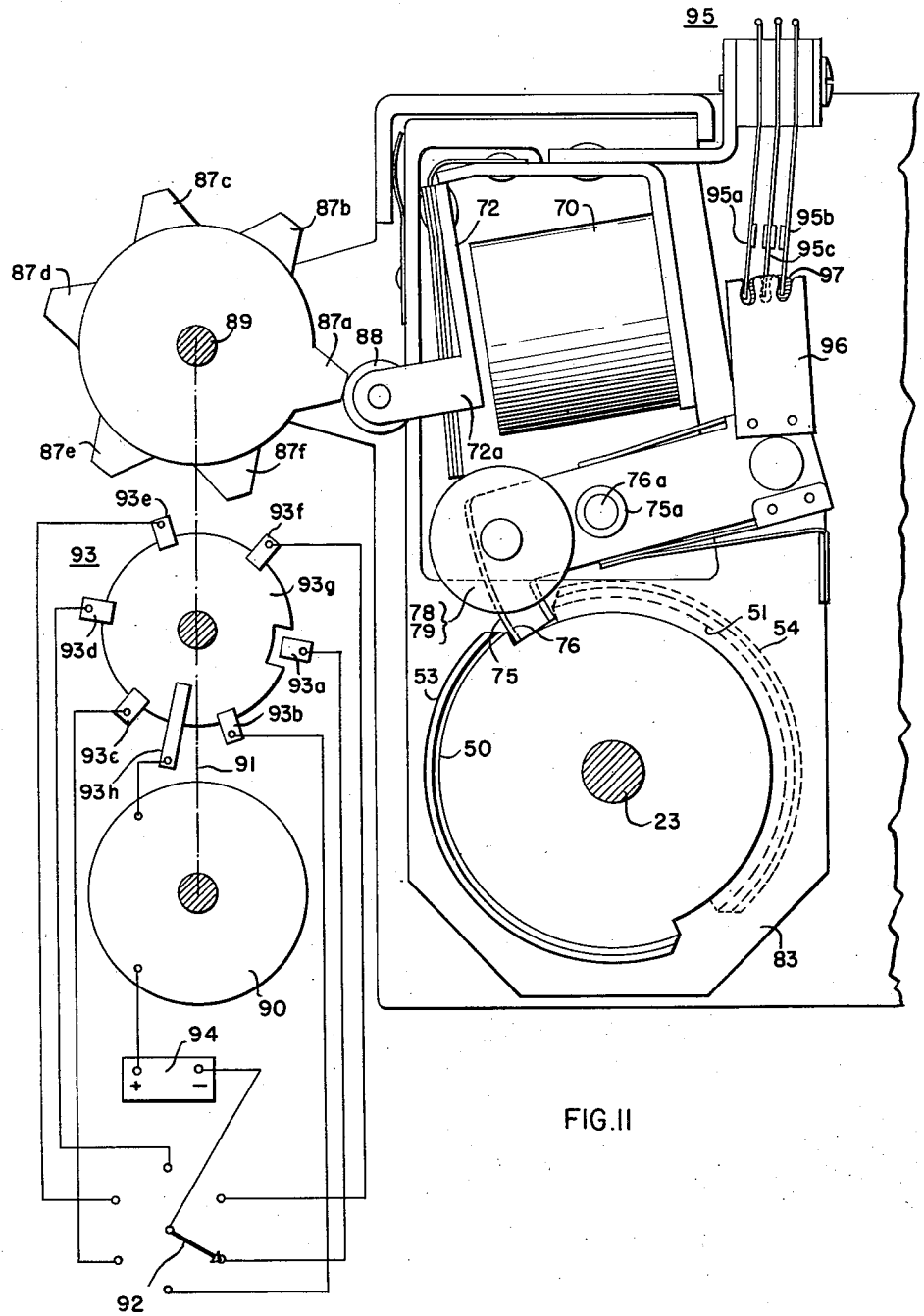
Figure 14:
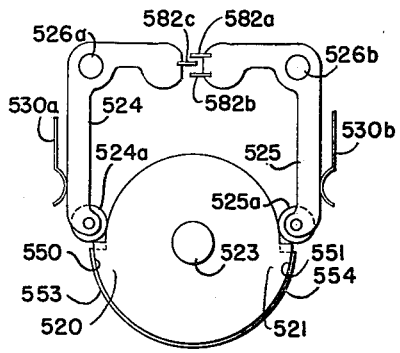
Figure 15:
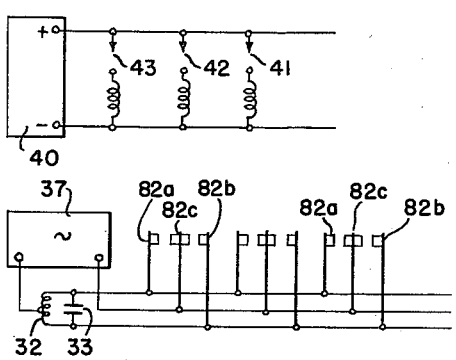
Figure 16:
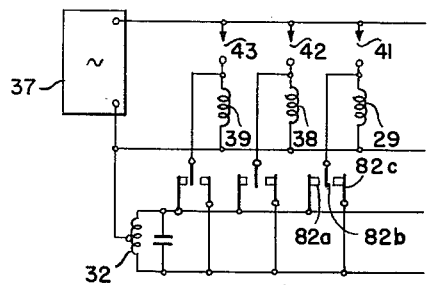
Figure 17:
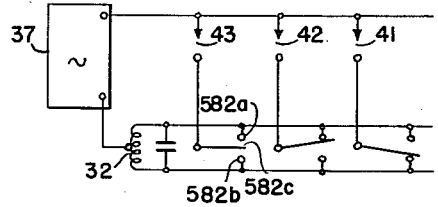
Figure 18:
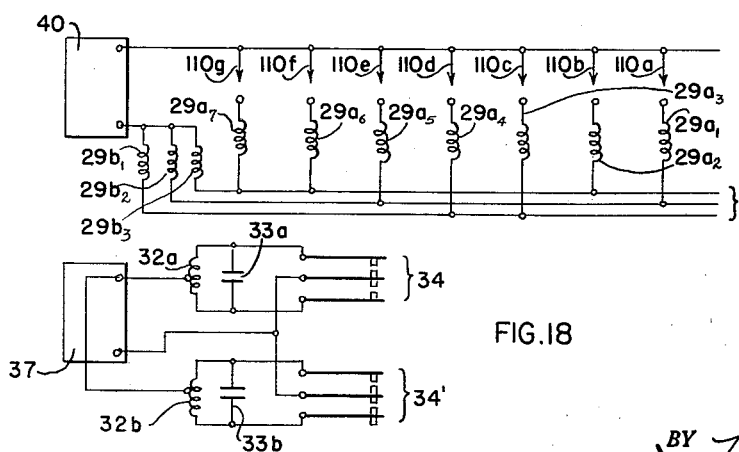

Referring now to the drawings, Fig. 1 is a schematic representation of an apparatus for positioning a rotary controlled element embodying the present invention in one of its simplest forms; Fig. 1a is a cross-sectional detail of one form of sector member suitable for use in the apparatus of Fig. 1 and taken along the lines 1a—1a of Fig. 1; Fig. 2 is a cross-sectional view along the lines 2—2 of Fig. 3, and Fig. 3 is a fragmentary plan view, of an apparatus embodying the invention and designed for operation over a multi-revolution range; Figs. 4–7, inclusive, are fragmentary detailed views of the rotatable sector members of the invention, their associated stop devices and sensing means in various possible operating positions to aid in the explanation of the invention; Fig. 8 is a cross-sectional view of a modification of the apparatus of Fig. 2 which permits an axial shortening of the apparatus; Fig. 9 is a cross-sectional view and Fig. 10 an end elevational view of a modified form of the apparatus of the invention in which individual sensing means are provided for each of the selector units; Figs. 10a, 10b, 10c are details of the stop devices and sensing means of the apparatus of Figs. 9 and 10; Fig. 11 is a cross-sectional view, partly schematic, of a modification of the apparatus of Figs. 9 and 10 designed for operation by an auxiliary position-repeating system; Fig. 12 is a fragmentary view of the rotatable sector members and co-operating stop devices of a modified form of the invention, in which the sector members of each unit are mounted on parallel shafts; Fig. 13 is a cross-sectional view of a modification of the apparatus of Figs. 2 and 3 in which the operating bails of the selector units are mounted on the same shaft as the rotatable sector members; Fig. 14 is a fragmentary view of an apparatus in which the pair of rotatable sector members comprise opposite end portions of a single sector structure and the stop devices engage diametrically opposite points of the sector structure; Fig. 15 is a simplified schematic circuit diagram of an electrical control circuit suitable for use in connection with the apparatus of Figs. 9 and 11; Fig. 16 is a simplified schematic circuit diagram of an alternative control circuit for apparatus as illustrated in Figs. 9 and 10; Fig. 17 is a simplified schematic circuit diagram of a control circuit for the apparatus of Fig. 14; while Fig. 18 is a simplified schematic circuit diagram of an electrical control circuit by means of which two or more of the apparatuses of the type illustrated in Figs. 2 and 3 may be combined for effecting two different controlling operations.

Referring now to Fig. 1 of the drawings, there is represented schematically an apparatus for positioning a rotary controlled element in any of a plurality of predetermined angular positions and comprising a plurality of control-element actuating units, only one of which is illustrated for the sake of clarity. Constructional details of certain of the elements of the Fig. 1 apparatus are shown in Figs. 2 and 3. This unit includes a pair of coaxial, axially displaced, substantially complementary rotatable sector members 20 and 21, which are preferably of the same diameter and adjacent to one another. If desired, they may be formed by stamping them from a single disc 22, as illustrated in Fig. 1a. The sector members 20 and 21 are mounted and secured to a shaft 23 which may, itself, be the controlled element to be positioned, or which may be connected thereto by any suitable driving mechanism. The sector members 20 and 21 have stop provisions comprising the end faces 20a of member 20 and 21a of member 21 which form therebetween a notch or recess, the opposed sides of which are axially offset.

The positioning apparatus also includes a pair of independently movable stop devices or latches 24 and 25 disposed individually to register with the stop provisions of the members 20 and 21, respectively, only when the controlled element or shaft 23 is in a predetermined angular position. The stop devices 24 and 25 are pivoted about a common axis, for example, a shaft 26 parallel to the shaft 23.

The positioning apparatus of Fig. 1 also includes a pair of control members, such as the bails 27 and 28, disposed to be actuated by the corresponding stop devices 24 and 25, respectively, of the pairs included in each of the selector units of the apparatus. This apparatus further includes actuating means for each of the pairs of stop devices 24, 25 for moving them into engagement with their respective sector members and for moving them relative to each other under the control of the sector members. This means may be either in the form of an electromagnet 29 included in the electrical circuit and duplicated in the dotted-line unit 29a for the sake of clarity. Alternatively, or in addition, the devices 24, 25 may be actuated by a pair of springs 30 and a manual pushbutton 31. The apparatus also includes a reversible driving system including a schematically represented reversible motor having a two-part reversible winding 32 and starting condenser 33 and which is mechanically connected by any suitable means (not shown) for driving the shaft 23 and the controlled element. A spring 59 serves to disengage the latches 24, 25 and hold them in inoperative positions except when brought into action by electromagnet 29 or pushbutton 31.

The positioning apparatus of Fig. 1 further includes sensing means, such as an electrical switch, responsive to relative movement between the stop devices 24, 25 for controlling the direction of operation of the reversible driving system or motor 32 in accordance with the sense of relative displacement of the stop devices. This electrical switch is preferably, as illustrated, a double throw switch having opposed outer contacts 34a and 34b mechanically connected, by mechanism represented by the dash line 35, to the actuating member or bail 27, and an inner contact 34c movable between circuit closing positions in engagement with the outer contacts 34a, 34b and operated by a mechanical connection, represented by the dash line 36, to the other of the actuating members or bails 28 so that the switch is closed in one or the other of its two positions in response to, and in accordance with, the sense of the relative movement between the stop devices 24 and 25. The reversible driving system also comprises an electrical control circuit for the apparatus and including the switch 34, the reversible motor 32, and any suitable source of current, such as the conventional alternating-current supply source 37. As illustrated, when the switch 34 is in its neutral position, the circuit is open and the motor 32 is de-energized.

In order to operate the controlled element or shaft 23 to any of a plurality of predetermined angular positions, the selector unit, represented in Fig. 1, is duplicated by a number of additional units having corresponding sector members mounted on the shaft 23, the actuating electromagnets for the other units being represented at 38 and 39. The electromagnets 29, 38, and 39 are connected in parallel across a suitable source of operating current 40 by means of manually operable pushbuttons 41, 42, and 43, respectively.

It is believed that the operation of the positioning apparatus of Fig. 1 will be clear to those skilled in the art from the foregoing description. Briefly, when the stop devices 24 and 25 move in unison in either direction, their bails 27 and 28 and switch contacts 34a, 34b and 34c, respectively, are also moved in unison and the electrical circuit of the motor 32 is maintained open. However, if the latches 24 and 25 are displaced relative to each other, their respective bails and switch contacts are also displaced and the switch 34 is operated to one or the other of its positions, depending upon the sense of relative movement between the devices 24 and 25. In one position of the switch 34, with the contacts 34a and 34c closed, the motor 32 operates in one direction, while in the other position of the switch 34 with the contacts 34b and 34c closed, the motor 32 is energized to operate in the reverse direction.

Thus, if the various parts of the apparatus initially have the positions represented in Fig. 1, and if either the manual pushbutton 31 or the electrical pushbutton 41 is closed, the devices 24 and 25 are actuated into engagement with the sector members. In the position illustrated, the device 24 will initially engage the surface of the sector member 20, but the device 25 continues its travel since sector member 21 is out of position for engagement thereby. This relative movement of the stop devices 24 and 25 will, as explained above, energize the motor 32, which is connected to rotate the shaft 23 in a given direction. Rotation will continue until the stop device 24 drops off the end 20a of the sector member 20. The stop devices 24 and 25 are then no longer displaced relative to each other, the switch 34 is returned to its neutral position, the circuit of the motor 32 is opened, and the shaft 23 stopped in this position. Thus, with this arrangement, the switch 34 serves both as a reversing switch for determining the direction of rotation of the motor 32 and also as a stopping and starting switch. With this arrangement, the motor is de-energized in the home position of the controlled element or shaft 23, thus eliminating the necessity for a separate motor circuit closing switch generally included in apparatus of this type. At home position, the face 24b of device 24 may engage the end surface 20a of sector 20 and face 25b of device 25 may engage surface 21a of sector 21, thereby locking shaft 23 precisely in home position. Devices 24 and 25 may thus serve both to direct the operation of the apparatus to home position and to lock it precisely at home position.

The apparatus represented in Fig. 1 is of the so-called half-revolution type, in which the range of control of the shaft 23 is limited to something less than one-half revolution. In the extension of prior rotary sector and latch devices to apparatus in which the controlled element operates over a multi-revolution range, certain difficulties are encountered when the initial position of the apparatus is only slightly displaced from the predetermined or home position which, unless special provision is made, may cause erroneous operation and jamming of the apparatus. The avoidance of such erroneous operation forms the subject of applicant's aforesaid copending applications Serial Nos. 771,999 and 772,000, now Patent Number 2,517,854, issued August 8, 1950. In all of such prior multi-revolution positioning apparatuses involving rotatable sectors and cooperating stop devices or latches, the operation of the driving motor of the system is controlled by the absolute position of the latch or latches relative to the frame of the unit. In the positioning apparatus of the present invention, the sensing switch controlling the driving motor operates in response only to the relative position of the two stop devices or latches. This not only avoids the difficulty, previously explained, of regions of erroneous operation, but also materially simplifies the switching apparatus, since a simple single-pole double-throw switch serves both for directing the motor and starting and stopping it.

The embodiment of the invention in a positioning apparatus of the multi-revolution type is illustrated in Figs. 2 and 3 of the drawings. For clarity, certain elements corresponding to the elements of the apparatus of Fig. 1 are identified by similar reference numerals even though only shown schematically in Fig. 1. Fig. 2 represents one of the control-element actuating units of which a plurality are indicated in Fig. 3, although only two are shown, one in section and one in plan view. Each of the actuating units includes a fast member rotatable within a multi-revolution range and including a pair of coaxial, axially displaced, complementary rotatable sector members 50 and 51 having stop provisions or end faces 50a and 51a, respectively, between which are formed an axially offset stop recess. The fast rotatable sector members 50 and 51 are secured by screws 49, 49 to a hub 52 which is, in turn, mounted on the shaft 23 and secured thereto in any angular position by set screws or other conventional means (not shown).

The unit also includes a slow rotatable member including a similar pair of complementary sector members 53 and 54, these members being provided with peripheral flanges 53a and 54a, respectively, overlying the fast sector members 50 and 51. As illustrated, the sector members 53 and 54 are closely adjacent but axially displaced along the shaft 23. As illustrated in Fig. 3, the sector members of the several actuating units are axially displaced along the common drive shaft 23. The slow sector members 53, 54 are driven by the fast sector members 50, 51 through a planetary reduction gearing. Briefly, the fast rotatable members 50, 51 carry a pair of pinions or sun gears 55, 55 which mesh with internal ring gears of the slow rotatable members 53, 54. Between the members 53 and 54 is disposed a stator plate 56 which also has internal gear teeth and which is prevented from rotation by engagement with the stationary pivot shaft 26. The tips of the teeth of the internal gears of the slow sector members 53, 54 are supported by and rotate upon a hub 58 which is attached to and rotates with fast sector members 50, 51 and is provided with recesses 58a and 58b in which the pinions 55, 55 are disposed. This planetary gearing system may be identical with that described in applicant's aforesaid copending applications Serial Nos. 771,999 and 772,000, now Patent Number 2,517,854, issued August 8, 1950. If it is desired that the controlled element or shaft 23 have an operating range of rotation of thirty revolutions, the internal gears of the slow rotatable members 53, 54 may be given sixty-five teeth and the internal gear of the stator member 56 may be given sixty-four teeth, in which case sixty-five revolutions of the high speed members 50, 51 are required for a single complete revolution of the slow speed members 53, 54. In one physical embodiment of the apparatus of Figs. 2 and 3, in which the gears have the number of teeth mentioned, the pinions 55, 55 have fourteen teeth each. While a single pinion is satisfactory in some cases, the use of two pinions overcomes any play or lost motion due to the fact that the sixty-five tooth gears and the sixty-four tooth gears are conveniently constructed with the same internal diameter.

As in the apparatus of Fig. 1, there are provided a pair of independently movable stop devices or latches 24, 25 pivoted about a common axis, such as the pivot shaft 26 parallel to the drive shaft 23. The latches 24 and 25 are disposed individually to register with the stop provisions of the fast and slow sector members, that is, with a recess between such sector members, only when the shaft 23 or controlled element is in a predetermined angular position. Specifically, the latch 24 is disposed to engage the fast sector member 50 and the slow sector member 53, while the latch 25 is disposed to engage the fast sector member 51 and the slow sector member 54. The apparatus further includes the control members or bails 27 and 28, indicated also schematically in Fig. 1, disposed to be actuated by corresponding ones of the several pairs of stop devices or latches 24, 25 of the selector units. The bails 27 and 28 are also pivoted about the shaft 26 and the bail 27 is disposed to be engaged by the latches 24 of the several selector units and bail 28 to be engaged by the latches 25 thereof, so that the bails 27 and 28 are jointly responsive to relative movement between the pairs of latches of any of the selector units.

The positioning apparatus of Figs. 2 and 3 also includes means for individually biasing the stop devices or latches 24, 25 out of engagement with their associated sector members. This biasing means may be in the form of a spring 59 slotted in the center to straddle the latches, one end 59a of which engages a stop shaft 60 and the other end 59b of which engages the latches 24 and 25 to bias them out of engagement with their associated sector members. There is also provided means for biasing the bails 27, 28 against movement relative to each other and this means may be in the form of a pair of opposed leaf springs 61 and 62 secured to one of the bails, for example, the bail 27, and extending outwardly to engage opposite faces of both of the bails 27 and 28. The springs 59, 61, and 62 are preferably formed with initial tension to aid in their biasing functions.

The positioning apparatus of Figs. 2 and 3 further includes a single actuating means for each of the pairs of stop devices or latches 24, 25 for overcoming the biasing means described and moving both of them into engagement with their respective sector members and for moving them relative to each other under the control of such sector members. As indicated in the embodiment of Fig. 1, this actuating means may be a manually controllable biasing spring or an electromagnet 29, but in the apparatus of Figs. 2 and 3 the use of an electromagnet 29 is preferred and is shown. The magnet 29 acts upon both of the latches 24, 25 simultaneously and, when one of them engages either a slow or fast sector member, the motion of the other continues, causing a relative displacement between the latches 24, 25 for control of the driving motor, as described hereinafter.

When the arrangement of Fig. 1 is extended to a multiple-revolution apparatus, such as that of Figs. 2 and 3, the relative motion between the latches 24, 25 is preferably limited so that, when one of the latches is in engagement with a slow sector member, the other latch is maintained out of engagement with its fast sector member. To this end, there is provided means for limiting the independent relative movement between the stop devices of each pair. This limiting means may be in the form of a lost motion device interconnecting the latches. For example, the latch 25 may be provided with a pin 25a extending through an enlarged hole 24a in the other latch member so that the relative movement between the latches is limited in amount to the difference in the diameters of the pin 25a and the hole 24a.

The positioning apparatus of Figs. 2 and 3 includes a reversible driving system, such as a reversible motor 32, for driving the controlled element or shaft 23 and for driving the fast sector members 50, 51 and the slow sector members 53, 54 at a preselected speed ratio determined by the planetary gearing, as described above. As in the apparatus of Fig. 1, there is also provided sensing means, such as an electrical switch 34, responsive to relative movement between the bails 27 and 28 and thus to relative movement between the latches 24, 25 for controlling the direction of operation of the motor in accordance with the sense of relative displacement between the stop devices. To this end, there are provided a pair of switch-actuating members connected individually to the latches 24, 25 through the bails 27, 28, respectively. These members may be in the form of sectors 35, 36 of insulation material riveted or otherwise secured to the side arms of the bails 27, 28, respectively. The actuating member 35 engages the two outer leaves of the switch 34 carrying the outer contacts 34a and 34b, while sector member 36 engages the middle leaf of the switch 34 carrying the inner contact 34c. The switch 34 is of the type described in connection with the apparatus of Fig. 1 and the electrical circuit associated with the positioning apparatus of Figs. 2 and 3 may be identical to that of Fig. 1. The leaves of the switch 34 are formed with initial tension so that they serve also as springs for holding the bails 27, 28 against the latches 24, 25, respectively. The whole apparatus is conventionally mounted in any suitable frame comprising end plates 63 and 64.

It is believed that the operation of the positioning apparatus of Figs. 2 and 3 will be clear by reference to the explanation of the operation of the apparatus of Fig. 1, in view of the detailed description of the fast and slow sector member assembly and its interconnecting planetary gearing found in applicant's aforesaid copending applications Serial Nos. 771,999 and 772,000, now Patent Number 2,517,854, issued August 8, 1950. However, the operation of the apparatus of Figs. 2 and 3 may be clarified by reference to Figs. 5, 6, 7, and 8 which illustrate the several elements of a selector unit in a number of typical operating positions. Fig. 4 illustrates the apparatus with the latch 24 in engagement with the slow sector member 53. Latch 25 is held out of engagement with the fast sector member 51 by the action of the stops 24a and 25a. The shaft 23 and sector members rotate in a clockwise direction, as indicated. Fig. 5 shows the next typical position of the elements in the cycle of operations. The slow sector member 53 has rotated approximately one-third of a revolution corresponding to approximately twenty revolutions of shaft 23. Latch 24 has just dropped off the end of the slow sector member 53 and is resting upon the fast sector member 50. The latches, bails, and switch remain in the same relative positions shown in Fig. 4, since the fast sector member 51 has moved out of position for engagement by the latch 25. The rotation of the shaft 23 and the sector members continues clockwise until latch 24 drops off the end of the fast sector member 50 and the face 25b of latch 25 is brought into engagement with the end 51a of its fast sector member 51, as shown at home position in Fig. 2. As shown in Fig. 2, the relative displacement between the latches 24 and 25 is eliminated, the inner contact 34c of switch 34 is returned to its neutral position, de-energizing the motor 32 and thus stopping the apparatus in the desired predetermined angular position.

Fig. 6 shows the positioning apparatus with the several elements in the relative positions for counterclockwise rotation of the shaft 23 with latch 25 in engagement with the slow sector member 54 and latch 24 held out of engagement with the fast sector member 50 by the action of the stops 24a, 25a. In this condition, the contacts 34b and 34c of switch 34 are closed to energize the motor 32 to drive the shaft 23 in the desired counterclockwise direction. Fig. 7 illustrates the apparatus with the elements in their relative positions after latch 25 has dropped off the end of the slow sector member 54 and is in engagement with the fast sector member 51. Latch 24 has now dropped down so that it is in position to engage fast sector member 50 as counterclockwise rotation continues. As this engagement occurs, latch 25 drops off the end of fast sector member 51 and the parts are again locked in home position, as illustrated in Fig. 2. The circuit connections to the motor 32 are, of course, arranged so that shaft 23 is driven clockwise when contacts 34a and 34c are closed, as shown in Figs. 4 and 5, and so that it is driven counterclockwise when contacts 34b and 34c are closed, as shown in Figs. 6 and 7.

In the positioning apparatus illustrated in Figs. 2-7, inclusive, it is preferable to design the latches 24 and 25 so that their outer end faces, such as face 24b, are cylindrical about the axis of the pivot shaft 26 so that they move into and out of engagement with the ends of the fast sector members 50 and 51, respectively, smoothly and without imparting rotation to the shaft 23. Also, it is advantageous to design the end faces of the fast sector members 50, 51 with a slight taper, as shown in Fig. 2, so that the latches 24, 25 engage these stop faces with a wedging action, pulling all of the elements precisely into home position, as shown in Fig. 2. The slow sector members 53 and 54 have their end faces undercut slightly, as shown in Fig. 2, so that the latches drop abruptly from the slow sector member to the fast sector members without substantial frictional impediment. This is particularly advantageous in apparatus in which a large number of revolutions is required of the shaft 23, for example, twenty or more, since the slow sector members then rotate only a few degrees for each revolution of shaft 23 and precision is required in releasing the latches in dropping from the slow sector members to the fast sector members. For positioning apparatus in which the shaft 23 rotates less than about twenty revolutions, the end faces of the slow sector members are preferably formed with a taper of about 45 degrees as shown in Fig. 9, described hereinafter. With the undercut construction of Fig. 2, precaution should be taken so that only one electromagnet 29 can be energized at any given time. Otherwise, with two sets of latches engaged simultaneously, one of them might come up against the end of one of the slow sector members and cause jamming. With the 45 degree taper construction, shown in Fig. 9, these precautions are unnecessary and jamming cannot occur regardless of the simultaneous excitation of the latches of several selector units, since the latches can ride up the tapered end faces of the slow sector members.

The fact that the switches 34 controlling the reversible motor 32 are normally open and are closed to operate the motor in one direction or the other only by displacement of the latches relative to each other imparts great flexibility to the positioning apparatus of the invention and permits many re-arrangements of components not available in prior latching-type positioning apparatus. For example, it may be advantageous in some installations to arrange the selector units and their magnets in two or more rows, thereby cutting down the length of the apparatus assembly. Each set of latches may be provided with its own bails and the motor switches simply connected in parallel; whichever switch is operated controls the motor and the other switches remain open and inactive. One such arrangement is illustrated in Fig. 8, which shows two sets of selector units diametrically opposed with respect to the controlled shaft 23. The corresponding elements of the lower selector unit are given the same reference numerals as the upper, with the exception that, in the case where duplicate elements are required, they are indicated by the same reference numerals in the 200 series. The operation of the apparatus of Fig. 8 is in all respects similar to that of the previous figures.

The normally open switches of the positioning apparatus embodying the invention permit a highly advantageous modification of the apparatus of Figs. 2–8, inclusive, in which each pair of stop devices or latches is provided with its own switch. Such a modification is represented in the apparatus of Figs. 9, 10, and 11, which also illustrate another advantageous feature, namely, a modified form of actuating means for each of the pairs of latches comprising an alternating-current operating magnet having a movable armature, a resilient actuating element, and a variable-force link mechanism interconnecting the actuating elements and their associated stop devices. Specifically referring to Figs. 9 and 10, each of the selector units includes an alternating-current electromagnet 70 with appropriate shading ring 70a and having its magnetic circuit completed through a frame member 71 and having an armature 72 effectively pivoted to the frame 71 by a single leaf spring 73 retained by a clamping member 74 riveted or otherwise secured to the frame 71. If desired, a manually operable pushbutton 68 may be attached to an extension 72a of armature 72 to assist, or to be used in lieu of, electromagnet 70. The apparatus also includes a pair of stop devices or latches 75 and 76 pivoted about a pivot shaft 69, the stop devices carrying at their outer ends arcuate cam members or rollers 78 and 79, respectively. Leaf springs 67, 67a engaging opposite faces of the latches 75, 76 serve to bias the latches against relative movement. The resilient actuating elements of the electromagnet 70 comprise multiple leaf springs 80, 81 secured at their upper ends to the armature 72 and operated thereby and disposed with their lower ends acting upon the cam members 78, 79, respectively, at an angle to the radii of the cams to the points of contacts which increases with movement of the stop devices or latches, thereby increasing the actuating force thereon, as explained hereinafter. The rotatable sector members 50, 51, 53, and 54 may be identical to those of the apparatus of Figs. 2–8, inclusive, with the exception of the tapered end faces previously described, and these sector members may be similarly mounted on and driven by the controlled shaft 23.

It is well known that the use of an alternating-current operating electromagnet in apparatus of the type described generally requires a spring connection to the latch or equivalent device, operated thereby because of the pulsating nature of the attraction of the electromagnet armature. In such an arrangement, the actuating force on the latches varies directly with the deflection of the interconnecting spring, which is a maximum when the latches are out of engagement with their respective stop recesses and a minimum when they are in complete engagement therewith. This is just the opposite of the desired relationship, in which a maximum actuating force is desired at the point of the operating cycle at which the latches engage their stop recesses in order precisely and forcefully to bring the sector members to their final home positions.

However, by the use of the actuating mechanism described, the desired result is obtained due to the variation in the angle at which the actuating springs 80, 81 act upon the rollers 78, 79, respectively. This relationship is shown by the fragmentary schematic diagrams of Figs. 10b and 10c. In Fig. 10b, the several elements of one of the latches, for example, the latch 76, and its actuating mechanism are shown with the latch out of engagement with the stop recess of its associated sector members. The vector $S_1$ represents the total force of the spring 81, which is resolved into a component $F_1$ acting through the axis of the roller 79 and the vector $T_1$ acting in line with the spring 81 and, therefore, of no effect. As shown by the extension of the vector $F_1$, this force acts about the axis of the pivot shaft 69 with a radius $R_1$. The relation between the vectors $T_1$, $S_1$, and $F_1$ is shown more clearly in the vector diagram adjacent Fig. 10b.

In Fig. 10c the parts are shown with the latch 76 in full engagement with the stop recess of its associated sector members. The actuating force of the spring 81 is now reduced in value to that represented by the vector $S_3$, which may be resolved into the components $T_3$ and $F_3$, the latter acting through the center of the roller 79. It is seen that, while the vector $S_3$ is less than the vector $S_1$, due to the change in the deflection of the spring 81, the vector $F_3$ is actually larger. Further, as indicated by the extension of the vector $F_3$, it now has a lever arm about the axis of the pivot shaft 69 represented by the radius $R_3$ so that the torque actuating the latch 76 is considerably increased.

In brief, as shown by the vector diagrams, the actuating force of the spring 81 is greatest in its outermost position, but the angles of action and the lever arms of the link mechanism are such that the pressure of the latch on its sector member is the least. This is desirable, since only nominal pressure is required on the latch in its outermost position, such pressure being merely sufficient to operate the switch contacts and to maintain the latch in engagement with its respective sector members. When the latch has been operated to full engagement with the stop recess of its associated sector members, the actuating force of the spring 81 is least, due to the reduced deflection of the spring, but the angles and lever arms are such that the force of the latch on the rotating sector members is the greatest. This is the desired relation, since at home position it is desirable to have maximum force on the latch in order mechanically to pull the positioning apparatus precisely into home position.

In one practical embodiment of the modification of applicant's positioning apparatus represented by Figs. 9 and 10, the force of each of the actuating springs measured 180 grams with the latches on the outer or slow sector members and the pressure of the latches on the sector members was also 180 grams. At home position, with the latches fully engaged with the recesses of the sector members, the spring force dropped to 120 grams, but the force of each of the latches on the bottom of the sector member recesses increased to 240 grams. Thus, a reduction in spring force of one-third actually resulted in a one-third increase in latch force.

In the modification of the positioning apparatus of Figs. 9 and 10, a sensing means or reversing switch is associated with each of the pairs of stop devices and includes co-operating contacts carried directly by the stop devices and closable in response to relative movement therebetween. Specifically, each switch 82 is in the form of a double-throw reversing switch including opposed outer contacts 82a, 82b carried by the stop device or latch 75 and an inner contact 82c carried by the stop device 76 and movable between the outer contacts in response to and in accordance with the sense of relative movement between the stop devices 75, 76. The switch contacts 82a, 82b, and 82c may be mounted directly on insulation plates 82d and 82e, respectively, secured to the stop devices 75 and 76.

The construction of Figs. 9 and 10 has another advantageous feature in that each of the selector units, including its individual sensing means, is independently supported from the frame members 63, 64 (Fig. 3). Specifically, this construction includes a plurality of supporting members or plates 83 for individually and independently suporting the stop devices or latches 75, 76, the sensing means or switch 82, and the actuating electromagnet 70. With this construction, the shaft-turning torque reaction of the plate 83 may be transmitted to the main frame through any appropriate construction, such as the rigid channel-shaped member 84 connected to the main frame members 63, 64 in any conventional manner. A leaf spring 85 secured to the plate 83 and bearing on the channel member 84 may be provided, if desired, to take up any lost motion, while permitting the plate 83 a slight floating motion for absorbing any eccentricities in the shaft 23, hubs, etc. In this construction, the plate 83 replaces the stator plate 56 of the construction of Figs. 2 and 3 and is provided with internal gear teeth which form a journal for the hub 58 which rotates with shaft 23. With the construction described, there is no tendency to bend the shaft 23 due to the pressure of the latches 75, 76 on the sector members mounted on shaft 23. This gives improved precision and makes feasible the use of longer shafts, permitting the construction of positioning apparatus of a greater number of selector units.

A schematic circuit diagram of an electrical circuit suitable for use with the apparatus of Figs. 9 and 10 is illustrated in Fig. 15. The various elements corresponding to those of Fig. 1 are identified by the same reference numerals. The principal difference in this circuit with respect to Fig. 1 is that the switch contacts 82a, 82b, 82c of the several selector units are respectively connected in parallel. This is feasible in applicant's improved positioning apparatus because of the fact that each of the switches is in circuit-opening position both when its associated selector unit is de-energized and when the controlled shaft 23 is in the setting corresponding to the particular selector unit.

In the case of apparatus of the type illustrated in Figs. 9 and 10 where it is feasible to wind the electromagnets and the motor for operation from the same electrical source, the simplified circuit of Fig. 16 may be utilized. The centering springs 67, 67a (Fig. 9) may then be omitted, simplifying the mechanism, since the pushbuttons 41, 42, 43 energize both electromagnets and motor and there is no danger of momentarily closing the motor circuit during the disengagement of latches when a button is released.

An alternative means of determining the particular selector to be actuated is represented in Fig. 11, in which there is provided a selector system for initiating operation of any of the selector units. This system comprises a plurality of co-axial, angularly spaced and axially spaced cams 87a—87f, inclusive, mounted on a drive shaft 89 each disposed to engage the actuating means of one of the selector units. To this end, the armature 72 of each selector unit is provided with an extension 72a carrying at its extremity a cam follower, such as a roller 88, adapted to be engaged by its respective one of the cams 87a—87f, inclusive. The selector system also includes means for driving the cams 87a—87f, inclusive, to engage a preselected actuating means of the selector units. This driving means may include a motor 90 driving the shaft 89 which, for the sake of clarity, is shown in severed portions interconnected by the mechanical linkage line 91. The selector system further includes a position-repeating circuit which may be of any conventional type, but is illustrated by way of example as including a manually operable selector switch 92 and a motor-driven switch 93 comprising a conductive disc 93g and a plurality of peripherally spaced stationary contacts or brushes 93a—93f, inclusive. The motor 90 is energized from a source 94 through corresponding contacts of the switches 92 and 93 and a brush 93h making continuous contact with the switch disc 93g. If desired, in this arrangement the electromagnet 70 may be omitted or it may be arranged as an alternative means for selecting the unit to be operated.

The operation of the position-repeating selector system of Fig. 11 is entirely conventional so that a detailed description thereof appears unnecessary. The operation of the positioning apparatus is in all respects similar to that of Figs. 9 and 10 described above, except that in this instance the sensing switch is not mounted on the latch assembly but comprises a plurality of switches 95 individual to the several selector units having outer contacts 95a, 95b, and an inner contact 95c. The switch is actuated by members 96, 97 of insulation material projecting from the latch members 74, 75, respectively. The latch members 74, 75 have the co-operating pin 76a and hole 75a, respectively, serving to limit the relative movement therebetween as in the apparatus of Figs. 2 and 3. The operation of the selector system is in all respects similar to that of Figs. 9 and 10.

While the positioning apparatus embodying applicant's invention is preferably constructed with the sector members coaxially arranged and axially spaced upon a common shaft, as in the several species of the invention described above, it is feasible to construct a positioning apparatus embodying the same principles with the sector members upon parallel shafts and with the stop devices or latches on a single shaft or on a pair of shafts also parallel with the sector member shafts. Such an arrangement is illustrated schematically in Fig. 12, in which the elements analogous to those of the apparatus of Fig. 1 are represented by corresponding reference numerals in the 300 series. It is seen that the sector members 320, 321 are mounted on parallel shafts 323a and 323b, respectively, which may be driven by drive shaft 323 through gearing 98—99a and 98—99b, respectively. In this construction, as in the construction of Figs. 2 and 3, the bails 327 and 328 are actuated solely in response to relative movement between stop devices or latches 324 and 325, respectively. In this construction it is preferable to have the sector members 320 and 321 of the same diameter. This is not essential as they can have any relative diameters so long as the proportioning of elements is such that the latches 324 and 325 are moved relative to one another appropriately in the various operating positions of the apparatus.

In Fig. 13 is represented a modified form of applicant's positioning apparatus of Fig. 8, in which the actuating bails are pivoted about the controlled shaft 23. In the construction of Fig. 13 corresponding elements are given the same reference numerals as those in Fig. 8, with the exception that elements of modified construction are given reference numerals in the 400 series. As in the construction of Fig. 8, two groups of selector units are disposed on diametrically opposite sides of the controlled shaft 23, thus permitting a greater number of selector units for any given shaft length. This symmetrical arrangement of the groups of selector units permits the use of a single pair of actuating bails 427, 428 pivoted about the shaft 23 and having extending actuating members of insulation material 435, 436, respectively. The internally geared stator members 456 are engaged at opposite ends in channel-shaped frame members 100, 101.

The electrical system of the apparatus of Fig. 13 is modified with respect to that of Fig. 8. Specifically, the electromagnets 29 and 229 and the corresponding electromagnets of other selector units are adapted to be selectively energized by pushbutton switches 103, 104, etc., it being obvious that an individual switch is provided for each electromagnet for selectively energizing the electromagnets from a suitable source 102. The driving means of the apparatus of Fig. 13 is illustrated as a direct-current motor 105 having an armature 105a, a shunt field 105b, and a series field 105c connected to be energized from a suitable direct-current source 106 through a switch 434. The switch 434 has three blades carrying the contacts 434a, 434c, and 434e disposed to be actuated by the member 435 and a pair of blades carrying contacts 434b and 434d disposed to be actuated by the member 436. In one relative position of any of the latch members 424, 425 and the bails 427, 428 actuated thereby, the motor armature 105a and its series field 105c are connected in series across the source 106 with one polarity through contacts 434a, 434b and 434c, 434d. When the actuating members 435 and 436 are relatively displaced in the opposite sense, the motor armature 105a and 105c are connected in series across source 106 through switch contacts 435b, 434c and 434d, 434e. As illustrated, the shunt field 105b is constantly connected across the source 106. It will be apparent that the switch and motor of the positioning apparatus of the preceeding figures may be in the form of the switch 434 and motor 105 of Fig. 13, if desired.

In Fig. 14 is represented schematically a modification of the positioning appartus of the invention, in which the latches of the preceeding forms of the invention are replaced by a pair of latches 524, 525 of bell-crank construction and in which the two complementary sector members are merged into a single structure having portions 520, 521 performing the same function. The latch members 524, 525 co-operate with the portions 520, 521, respectively. The switch for controlling the reversible motor may be operated by bails actuated by the latches 524, 525 as in Fig. 1, or, as illustrated, there may be provided a pair of switches 582a, 582b, 582c individual to the latch members 524, 525. As in the preceding embodiments of the invention, the sensing switches 582a, 582b, 582c are controlled by the relative position of the two latches. The apparatus of Fig. 14 illustrates another advantageous feature of the invention. In this construction the end faces of the latches 524, 525 are tapered or provided with rollers as illustrated and are continuously biased into engagement with their respective sector members 520, 521 by springs 530a, 530b, respectively. As shown in the circuit diagram of Fig. 17 the pushbuttons or selector switches 41, 42, 43 may be connected to control the circuit of the reversing motor directly.

In Fig. 17 is represented schematically a circuit diagram of an electrical control system appropriate for the apparatus of Fig. 14. The motor 32 is controlled directly by a selected one of the push buttons 41, 42, 43 and its corresponding one of the latch-operated switches 582.

In Fig. 18 is represented schematically a circuit diagram of an electrical control system for combining two positioning apparatuses of the type representing in preceding Figs. 2-10, inclusive, and 13. The operating electromagnets of one of the tuning devices are represented by the winding $29a_1$—$29a_7$, inclusive, which are adapted to be connected across a suitable control source 40 through the manually operable pushbuttons 110a—110g, inclusive, respectively. The electromagnets of other tuning devices are represented by the windings $29b_1$—$29b_3$, inclusive, which are connected to be energized in series with selected ones of the pushbuttons 110a—110g, inclusive. For example, operation of pushbutton 110a is effective to energize windings $29a_1$ and $29b_2$ in series to actuate the first tuner to its number one position and the second tuner to its number two position. The driving motors of the two tuners are represented by the windings 32a and 32b and their associated switches 34 and 34', respectively. It will be understood that the operation of each of the tuners is as described above, depending upon which of the several species of tuners is employed. The electrical system of Fig. 18 is suitable, for example, for application to a multi-band broadcast receiver in which the "a" tuner is connected for tuning the receiver to selected stations within a given band and the "b" tuner is adapted for switching the receiver between the several tuning bands.

Thus, it is seen that each of the rotary positioning apparatuses of the invention, described above, operates fundamentally in response to the relative displacement of two stop devices or latches rather than in response to a displacement of a stop device relative to a frame or other fixed member. In addition to its directness, such a construction is characterized by extreme flexibility, simplicity and freedom from regions of possible erroneous operation. Furthermore, the use of two stop devices and the wedging action of the devices at home position eliminates the effect of lost motion between the stop devices and their pivots, assuring increased precision. Furthermore, since the switch or other sensing device is actuated by relative displacement of the stop devices or bails, any distortion of the bails due to the applied pressures is substantially the same in both bails, so that the operation of the sensing device is not critically affected thereby as it is in tuners depending upon the displacement of a stop device relative to a frame or other supporting member.

While there have been described what are at present considered to be the preferred objects of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Apparatus for positioning a rotary controlled element in a predetermined angular position comprising: at least one pair of substantially complementary rotatable sector members having stop provisions; a pair of independently movable stop devices, each disposed individually to register with said stop provisions of one of said sector members only when said controlled element is in a predetermined angular position; a reversible driving system for concurrently driving said sector members and said controlled element; and sensing means responsive to relative movement between said stop devices for controlling the direction of operation of said reversible driving system in accordance with the sense of relative displacement of said stop devices.

2. Apparatus for positioning a rotary controlled element in a predetermined angular position comprising: at least one pair of substantially complementary rotatable sector members forming stop recesses between adjacent end faces thereof; a pair of independently movable latches, each disposed individually to register with said recesses between said sector members only when said controlled element is in a predetermined angular position; a reversible driving system for concurrently driving said sector members and said controlled element; and sensing means responsive to relative movement between said latches for controlling the direction of operation of said reversible driving system in accordance with the sense of relative displacement of said latches.

3. Apparatus for positioning a rotary controlled element in a predetermined angular position comprising: at least one pair of coaxial axially displaced substantially complementary rotatable sector members having stop provisions; a pair of independently movable axially displaced stop devices, each disposed individually to register with said stop provisions of one of said sector members only when said controlled element is in a predetermined angular position; a reversible driving system for concurrently driving said sector members and said controlled element; and sensing means responsive to relative movement between said stop devices for controlling the direction of operation of said reversible driving system in accordance with the sense of relative displacement of said stop devices.

4. Apparatus for positioning a rotary controlled element in a predetermined angular position comprising: at least one pair of substantially complementary rotatable sector members having stop provisions; a pair of independently movable stop devices, each disposed individually to register with said stop provisions of one of said sector members only when said controlled element is in a predetermined angular position; a reversible driving motor for concurrently driving said sector members and said controlled element; and an electrical control circuit for said motor including a double-throw electrical switch operable in response to relative movement between said stop devices for controlling the direction of operation of said reversible driving motor in accordance with the sense of relative displacement of said stop devices.

5. Apparatus for positioning a rotary controlled element in a predetermined angular position comprising: at least one pair of substantially complementary rotatable sector members having stop provisions; a pair of independently movable stop devices, each disposed individually to register with said stop provisions only when said controlled element is in a predetermined angular position; a reversible driving motor for concurrently driving said sector members and said controlled element; and an electrical control circuit for said motor including a double-throw electrical switch having two circuit-closing positions and a neutral circuit-opening position, said switch being operable to either circuit-closing position in response to relative movement between said stop devices for controlling the direction of operation of said reversible driving motor in accordance with the sense of relative displacement of said stop devices and being operable to circuit-opening position in response to substantial absence of relative displacement between said stop devices to de-energize said motor.

6. Apparatus for positioning a rotary controlled element in a predetermined angular position comprising: at least one pair of substantially complementary rotatable sector members having stop provisions; a pair of independently movable stop devices, each disposed individually to register with said stop provisions of one of said sector members only when said controlled element is in a predetermined angular position; a lost-motion device interconnecting said stop devices for limiting the relative movement therebetween; a reversible driving system for concurrently driving said sector members and said controlled element; and sensing means responsive to relative movement between said stop devices for controlling the direction of operation of said reversible driving system in accordance with the sense of relative displacement of said stop devices.

7. Apparatus for positioning a rotary controlled element in a predetermined angular position comprising: at least one pair of substantially complementary rotatable sector members having stop provisions; a pair of independently movable stop devices, each disposed individually to register with said stop provisions of one of said sector members only when said controlled element is in a predetermined angular position; means for biasing said stop devices out of engagement with said sector members; actuating means for overcoming said biasing means and moving both said stop devices into engagement with said sector members; a reversible driving system for concurrently driving said sector members and said controlled element; and sensing means responsive to relative movement between said stop devices for controlling the direction of operation of said reversible driving system in accordance with the sense of relative displacement of said stop devices.

8. Apparatus for positioning a rotary controlled element in a predetermined angular position comprising: at least one pair of substantially complementary rotatable sector members having stop provisions; a pair of independently movable stop devices, each disposed individually to register with said stop provisions only when said controlled element is in a predetermined angular position;

means for biasing said stop devices against movement relative to each other; actuating means for overcoming said biasing means and moving said stop devices relative to each other under the control of said sector members; a reversible driving system for concurrently driving said sector members and said controlled element; and sensing means responsive to relative movement between said stop devices for controlling the direction of operation of said reversible driving system in accordance with the sense of relative displacement of said stop devices.

9. Apparatus for positioning a rotary controlled element in a predetermined angular position comprising: at least one pair of substantially complementary rotatable sector members having stop provisions; a pair of independently movable stop devices, each disposed individually to register with said stop provisions only when said controlled element is in a predetermined angular position; a pair of switch-actuating members connected individually to said stop devices; a reversible driving system for concurrently driving said sector members and said controlled element; and a double-throw switch having opposed outer contacts operated by one of said actuating members and an inner contact movable between said outer contacts and operated by the other of said actuating members for controlling the direction of operation of said reversible driving system in accordance with the sense of relative displacement of said stop devices.

10. Apparatus for positioning a rotary controlled element in any of a plurality of predetermined angular positions comprising: a plurality of controlled-element actuating units, each including at least one pair of substantially complementary rotatable sector members having stop provisions, said sector members of said units being axially spaced along a common drive shaft, and a pair of independently movable stop devices, each disposed individually to register with said stop provisions only when said controlled element is in a predetermined angular position; a reversible driving system for driving said shaft and said controlled element; and sensing means responsive to relative movement between the stop devices of any of said pairs for controlling the direction of operation of said reversible driving system in accordance with the sense of relative displacement of said stop devices.

11. Apparatus for positioning a rotary controlled element in a predetermined angular position comprising: at least one pair of substantially complementary rotatable sector members having stop provisions; a pair of independently movable stop devices, each disposed individually to register with said stop provisions only when said controlled element is in a predetermined angular position; a reversible driving system for concurrently driving said sector members and said controlled element; a pair of control members each disposed to be actuated by any of the corresponding ones of said pairs of stop devices; and sensing means responsive to relative movement between said control members for controlling the direction of operation of said reversible driving system in accordance with the sense of relative displacement of said stop devices.

12. Apparatus for positioning a rotary controlled element in a predetermined angular position comprising: at least one pair of substantially complementary rotatable sector members having stop provisions; a pair of independently movable stop devices, each disposed individually to register with said stop provisions only when said controlled element is in a predetermined angular position; a reversible driving system for concurrently driving said sector members and said controlled element; and an electrical control circuit for said motor including a reversing switch including co-operating contacts carried by said stop devices and closable in response to relative movement therebetween for controlling the direction of operation of said reversible driving system in accordance with the sense of relative displacement of said stop devices.

13. Apparatus for positioning a rotary controlled element in a predetermined angular position comprising: at least one pair of substantially complementary rotatable sector members having stop provisions; a pair of independently movable stop devices, each disposed individually to register with said stop provisions only when said controlled element is in a predetermined angular position; a reversible motor for concurrently driving said sector members and said controlled element; a double-throw reversing switch including opposed outer contacts carried by one of said stop devices and an inner contact carried by the other of said stop devices and movable between said outer contacts in response to, and in accordance with the sense of, relative movement between said stop devices; and an electrical circuit including said switch for controlling the direction of operation of said reversible motor in accordance with the sense of relative displacement of said stop devices.

14. Apparatus for positioning a rotary controlled element in a predetermined angular position comprising: at least one pair of substantially complementary rotatable sector members having stop provisions; a pair of independently movable stop devices, each disposed individually to register with said stop provisions only when said controlled element is in a predetermined angular position; a reversible driving system for concurrently driving said sector members and said controlled element; an electrical control circuit for said motor including a reversing switch including co-operating contacts carried by said stop devices and closable in response to relative movement therebetween for controlling the direction of operation of said reversible driving system in accordance with the sense of relative displacement of said stop devices; and means for biasing said stop devices against movement relative to each other normally to maintain said switch contacts open.

15. Apparatus for positioning a rotary controlled element in a predetermined angular position comprising: at least one pair of substantially complementary rotatable sector members having stop provisions; a pair of independently movable stop devices, each disposed individually to register with said stop provisions only when said controlled element is in a predetermined angular position; means for biasing said stop devices out of engagement with said sector members; actuating means for each of said stop devices for overcoming said biasing means and comprising an operating electromagnet having a movable armature, a resilient actuating element, and a variable-force link mechanism interconnecting said actuating element and its associated stop device; a reversible driving system for concurrently driving said sector members and said controlled element; and sensing means responsive to relative movement between said stop devices for controlling the direction of operation of said reversible driving system in accordance with the sense of relative displacement of said stop devices.

16. Apparatus for positioning a rotary controlled element in a predetermined angular position comprising: at least one pair of substantially complementary rotatable sector members having stop provisions; a pair of independently movable stop devices, each disposed individually to register with said stop provisions only when said controlled element is in a predetermined angular position; means for individually biasing said stop devices out of engagement with said sector members; actuating means for each of said stop devices for overcoming said biasing means and comprising an operating alternating-current electromagnet having a movable armature, an arcuate cam member carried by its associated stop device, and a resilient actuating element operated by said armature and acting upon said cam member at an angle to the radius to the point of contact which increases with movement of said stop device, thereby increasing the actuating force on said stop device; a reversible driving system for concurrently driving said sector members and said controlled element; and sensing means responsive to relative movement between said stop devices for controlling the direction of operation of said reversible driving system in accordance with the sense of relative displacement of said stop devices.

17. Apparatus for positioning a rotary controlled element in a predetermined angular position comprising: at least one pair of substantially complementary rotatable sector members having stop provisions; a pair of independently movable stop devices, each disposed individually to register with said stop provisions only when said controlled element is in a predetermined angular position; means for individually biasing said stop devices out of engagement with said sector members; actuating means for each of said stop devices for overcoming said biasing means and comprising an operating alternating-current electromagnet having a movable armature, a roller carried by its associated stop device, and a leaf spring operated by said armature and disposed with one end acting upon said roller at an angle to the radius to the point of contact which increases with movement of said stop device, thereby increasing the actuating force on said stop device; a reversible driving system for concurrently driving said sector members and said controlled element; and sensing means responsive to relative movement between said stop devices for controlling the direction of operation of said reversible driving system in accordance with the sense of relative displacement of said stop devices.

18. Apparatus for positioning a rotary controlled element in any of a plurality of predetermined angular positions comprising: a plurality of controlled-element actuating units, each including at least one pair of substantially complementary rotatable sector members having stop provisions, said sector members of said units being axially spaced along a common drive shaft, and a pair of independently movable stop devices, each disposed individually to register with said stop provisions only when said controlled element is in a predetermined angular position; a reversible driving system for driving said shaft and said controlled element; sensing means responsive to relative movement between the stop devices of any of said pairs for controlling the direction of operation of said reversible driving system in accordance with the sense of relative displacement of said stop devices; and a supporting frame for the apparatus, each of said sensing means being independently supported directly from said frame.

19. Apparatus for positioning a rotary controlled element in any of a plurality of predetermined angular positions comprising: a plurality of controlled-element actuating units, each including at least one pair of substantially complementary rotatable sector members having stop provisions, said sector members of said units being axially spaced along a common drive shaft, and a pair of independently movable stop devices, each disposed individually to register with said stop provisions only when said controlled element is in a predetermined angular position; a reversible driving system for driving said shaft and said controlled element; sensing means responsive to relative movement between the stop devices of any of said pairs for controlling the direction of operation of said reversible driving system in accordance with the sense of relative displacement of said stop devices; a supporting frame for the apparatus; a plurality of supporting members for individually and independently supporting the stop devices and sensing means of each of said units directly from said frame; and an electromagnetic actuating device for each of said units supported on its respective supporting member.

20. Apparatus for positioning a rotary controlled element in a predetermined angular position comprising: a fast member rotatable within a multi-revolution range and including a pair of substantially complementary sector members and stop provisions; a slow rotatable member including a pair of substantially complementary sector members and stop provisions; a pair of independently movable stop devices, each disposed individually to register with the stop provisions of one of said fast and slow members only when said controlled element is in a predetermined angular position; a reversible driving system for driving said controlled element and for driving said members at a preselected speed ratio; and sensing means responsive to relative movement between said stop devices for controlling the direction of operation of said reversible driving system in accordance with the sense of relative displacement of said stop devices.

21. Apparatus for positioning a rotary controlled element in a predetermined angular position comprising: a fast member rotatable within a multi-revolution range and including a pair of substantially complementary sector members and stop provisions; a slow rotatable member including a pair of substantially complementary sector members and stop provisions, said slow sector members having peripheral flanges overlying said fast sector members; a pair of independently movable stop devices, each disposed individually to register with the stop provisions of one of said fast and slow members only when said controlled element is in a predetermined angular position; a reversible driving system for driving said controlled element and for driving said members at a preselected speed ratio; and sensing means responsive to relative movement between said stop devices for controlling the direction of operation of said reversible driving system in accordance with the sense of relative displacement of said stop devices.

22. Apparatus for positioning a rotary controlled element in a predetermined angular position comprising: a fast member rotatable within a multi-revolution range and including a pair of substantially complementary sector members and stop provisions; a slow rotatable member including a pair of substantially complementary sector members and stop provisions; a common drive shaft on which said fast sector members are mounted; a planetary reduction gearing interconnecting said fast and slow sector members; a pair of independently movable stop devices, each disposed individually to register with the stop provisions of one of said fast and slow members only when said controlled element is in a predetermined angular position; a reversible driving system for driving said controlled element and for driving said members at a preselected speed ratio; and sensing means responsive to relative movement between said stop devices for controlling the direction of operation of said reversible driving system in accordance with the sense of relative displacement of said stop devices.

23. Apparatus for positioning a rotary controlled element in a predetermined angular position comprising: a fast member rotatable within a multi-revolution range and including a pair of substantially complementary sector members and stop provisions; a slow rotatable member including a pair of substantially complementary sector members and stop provisions, said slow sector members having peripheral flanges overlying said fast sector members; a pair of independently movable stop devices, each disposed individually to register with the stop provisions of one of said fast and slow members only when said controlled element is in a predetermined angular position; means for limiting the relative movement between said stop devices to an amount such that when one of said stop devices is in engagement with its slow sector member the other stop device is maintained out of engagement with its fast sector member; a reversible driving system for driving said controlled element and for driving said members at a preselected speed ratio; and sensing means responsive to relative movement between said stop devices for controlling the direction of operation of said reversible driving system in accordance with the sense of relative displacement of said stop devices.

24. Apparatus for positioning a rotary controlled element in a predetermined angular position comprising: a fast member rotatable within a multi-revolution range and including a pair of substantially complementary sector members and stop provisions; a slow rotatable member including a pair of substantially complementary sector members and stop provisions; a pair of independently movable pivoted stop devices, each disposed individually to register with the stop provisions of one of said fast and slow members only when said controlled element is in a predetermined angular position; a lost-motion connection between said stop devices for limiting the independent motion therebetween; a reversible driving system for driving said controlled element and for driving said members at a preselected speed ratio; and sensing means responsive to relative movement between said stop devices for controlling the direction of operation of said reversible driving system in accordance with the sense of relative displacement of said stop devices.

25. Apparatus for positioning a rotary controlled element in any of a plurality of predetermined angular positions comprising: a plurality of controlled-element actuating units, each including at least one pair of substantially complementary rotatable sector members having stop provisions and a pair of independently movable stop devices, each disposed individually to register with said stop provisions only when said controlled element is in a predetermined angular position, said sector members of said units being axially spaced along a common drive shaft and said stop devices being pivoted about a common axis; a reversible driving system for driving said shaft and said controlled element; and a pair of pivoted bails, each disposed and arranged to be engaged by corresponding ones of said pairs of stop devices and responsive to relative movement between the stop devices of any of said pairs for controlling the direction of operation of said reversible driving system in accordance with the sense of relative displacement of said stop devices.

26. Apparatus for positioning a rotary controlled element in any of a plurality of predetermined angular positions comprising: a plurality of controlled-element actuating units, each including at least one pair of substantially complementary rotatable sector members having stop provisions and a pair of independently movable stop devices, each disposed individually to register with said stop provisions only when said controlled element is in a predetermined angular position, said sector members of said units being axially spaced along a common drive shaft and said stop devices being pivoted about a shaft parallel to said drive shaft; a reversible driving system for driving said shaft and said controlled element; a pair of bails pivoted about said stop device shaft, each disposed and arranged to be engaged by corresponding ones of said pairs of stop devices and jointly responsive to relative movement between the stop devices of any of said pairs for controlling the direction of operation of said reversible driving system in accordance with the sense of relative displacement of said stop devices.

27. Apparatus for positioning a rotary controlled element in any of a plurality of predetermined angular positions comprising: a plurality of controlled-element actuating units, each including at least one pair of substantially complementary rotatable sector members having stop provisions and a pair of independently movable stop devices, each disposed individually to register with said stop provisions only when said controlled element is in a predetermined angular position, said sector members of said units being axially spaced along a common drive shaft and said stop devices being pivoted about a common axis; a reversible driving system for driving said shaft and said controlled element; a pair of pivoted bails, each disposed and arranged to be actuated by corresponding ones of said pairs of stop devices; means for biasing said bails against movement relative to each other; and sensing means responsive to relative movement between said bails for controlling the direction of operation of said reversible driving system in accordance with the sense of relative displacement of said stop devices.

28. Apparatus for positioning a rotary controlled element in a predetermined angular position comprising: a fast member rotatable within a multi-revolution range and including a pair of substantially complementary sector members and stop provisions; a slow rotatable member including a pair of substantially complementary sector members and stop provisions; a pair of independently movable stop devices, each disposed individually to register with the stop provisions of one of said fast and slow members only when said controlled element is in a predetermined angular position; a reversible driving system for driving said controlled element and for driving said members at a preselected speed ratio; and a reversing switch including co-operating contacts carried by said stop devices and closable in response to relative movement therebetween for controlling the direction of operation of said driving system in accordance with the sense of relative displacement of said stop devices.

29. Apparatus for positioning a rotary controlled element in a predetermined angular position comprising: a fast member rotatable within a multi-revolution range and including a pair of substantially complementary sector members and stop provisions; a slow rotatable member including a pair of substantially complementary sector members and stop provisions; a pair of independently movable stop devices, each disposed individually to register with the stop provisions of one of said fast and slow members only when said controlled element is in a predetermined angular position; a reversible motor for driving said controlled element and for driving said members at a preselected speed ratio; a double-throw reversing switch including opposed outer contacts carried by one of said stop devices and an inner contact carried by the other of said stop devices and movable between said outer contacts in response to, and in accordance with the sense of, relative movement between said stop devices; and an electrical circuit including said switch for controlling the direction of operation of said reversible motor in accordance with the sense of relative displacement of said stop devices.

30. Apparatus for positioning a rotary controlled element in any of a plurality of predetermined angular positions comprising: a plurality of controlled-element actuating units, each including at least one pair of substantially complementary sector members and stop provisions; a pair of independently movable stop devices, each disposed individually to register with said stop provisions only when said controlled element is in a predetermined angular position, said sector members of said units being axially spaced along a common drive shaft, and resilient actuating means for urging said stop devices into engagement with their respective sectors; a reversible driving system for driving said controlled element and said members; sensing means responsive to relative movement between said stop devices for controlling the direction of operation of said reversible driving system in accordance with the sense of relative displacement of said stop devices; and a selector system for initiating operation of any of said units comprising a plurality of coaxial angularly spaced cams each disposed to engage one of said actuating means, and means for driving said cams to engage a preselected actuating means.

31. Apparatus for positioning a rotary controlled element in any of a plurality of predetermined angular positions comprising: a plurality of controlled-element actuating units, each including at least one pair of substantially complementary sector members and stop provisions; a pair of independently movable stop devices, each disposed individually to register with said stop provisions only when said controlled element is in a predetermined angular position, said sector members of said units being axially spaced along a common drive shaft, and resilient actuating means for urging said stop devices into engagement with their respective sectors; a reversible driving system for driving said controlled element and said members; sensing means responsive to relative movement between said stop devices for controlling the direction of operation of said reversible driving system in accordance with the sense of relative displacement of said stop devices; and a selector system for initiating operation of any of said units comprising a plurality of coaxial angularly spaced cams each disposed to engage one of said actuating means, a motor for driving said cams, and a position-repeating circuit including a manually operable switch and said motor for driving said cams to a position corresponding to the setting of said switch.

32. Apparatus for positioning a controlled element in a predetermined position comprising: at least one pair of movable complementary cam members having stop provisions; a pair of independently movable cam followers, each disposed individually to register with said stop provisions of one of said cam members only when said controlled element is in said predetermined position; a reversible driving system for concurrently driving said cam members and said controlled element; and sensing means responsive to relative movement between said followers for controlling the direction of operation of said driving system in accordance with the sense of relative displacement of said followers.

33. In an apparatus for positioning a rotary controlled element in a predetermined angular position and including a reversible driving system for the controlled element, a controlled-element actuating unit comprising: at least one pair of substantially complementary rotatable sector members having stop provisions and adapted to be driven by said driving system; a pair of independently movable stop devices, each disposed individually to register with said stop provisions only when said controlled element is in a predetermined angular position; and sensing means responsive to relative movement between said stop devices for controlling the direction of operation of said reversible driving system in accordance with the sense of relative displacement of said stop devices.

34. In an apparatus for positioning a rotary controlled element in a predetermined angular position and including a reversible driving system for the controlled element, a controlled-element actuating unit comprising: a fast member rotatable within a multi-revolution range and including a pair of substantially complementary rotatable sector members having stop provisions, a slow rotatable member including a pair of substantially complementary sector members and stop provisions; said rotatable members being adapted to be driven by said driving system at a preselected speed ratio; a pair of independently movable stop devices, each disposed individually to register with the stop provisions of one of said fast and slow members only when said controlled element is in a predetermined angular position; and sensing means responsive to relative movement between said stop devices for controlling the direction of operation of said reversible driving system in accordance with the sense of relative displacement of said stop devices.

35. Apparatus for positioning a rotary controlled element in any of a plurality of predetermined angular positions comprising: a plurality of controlled-element actuating units, each including at least one pair of substantially complementary rotatable sector members having stop provisions and a pair of independently movable stop devices, each disposed individually to register with said stop provisions only when said controlled element is in a predetermined angular position, said sector members of said units being axially spaced along a common drive shaft; a reversible driving system for driving said shaft and said controlled element; and a plurality of sensing means individual to said units and responsive to relative movement between said stop devices for controlling the direction of operation of said reversible driving system in accordance with the sense of relative displacement of said stop devices.

HAROLD F. ELLIOTT.

REFERENCES CITED

The following references are of record in the file of this patent:

UNITED STATES PATENTS

| Number | Name | Date |
| --- | --- | --- |
| 1,777,796 | Hubnell | Oct. 7, 1930 |
| 2,263,989 | Hill et al. | Nov. 25, 1941 |
| 2,526,152 | Paessler | Oct. 17, 1950 |